(12) United States Patent
Cornett et al.

(10) Patent No.: US 7,792,102 B2
(45) Date of Patent: Sep. 7, 2010

(54) SCALING EGRESS NETWORK TRAFFIC

(75) Inventors: Linden Cornett, Portland, OR (US); Parthasarathy Sarangam, Portland, OR (US); Sujoy Sen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 604 days.

(21) Appl. No.: 11/395,959

(22) Filed: Mar. 31, 2006

(65) Prior Publication Data

US 2007/0230489 A1    Oct. 4, 2007

(51) Int. Cl.
H04L 12/28 (2006.01)
H04L 12/56 (2006.01)

(52) U.S. Cl. ........................ 370/389; 370/412

(58) Field of Classification Search .............. 370/389, 370/392, 395.3, 412, 429; 711/216
See application file for complete search history.

(56) References Cited

U.S. PATENT DOCUMENTS

| | | | |
|---|---|---|---|
| 6,075,791 A | 6/2000 | Chiussi et al. | |
| 6,603,738 B1 | 8/2003 | Kari et al. | |
| 2002/0003777 A1* | 1/2002 | Miyamoto | 370/236 |
| 2002/0176430 A1* | 11/2002 | Sangha et al. | 370/412 |
| 2003/0058876 A1 | 3/2003 | Connor et al. | |
| 2003/0058878 A1 | 3/2003 | Minnick et al. | |
| 2004/0073946 A1* | 4/2004 | Kobayashi | 725/132 |
| 2004/0111635 A1 | 6/2004 | Boivie et al. | |
| 2004/0184470 A1 | 9/2004 | Holden | |
| 2004/0267967 A1 | 12/2004 | Sarangam et al. | |
| 2005/0152354 A1* | 7/2005 | Abel et al. | 370/389 |
| 2005/0249228 A1 | 11/2005 | Cornett | |
| 2006/0004904 A1 | 1/2006 | Sarangam et al. | |
| 2007/0115982 A1* | 5/2007 | Pope et al. | 370/392 |

OTHER PUBLICATIONS

PCT International Search Report. PCT/US2007/064573, (Sep. 12, 2007), 2 pgs.
Pending U.S. Appl. No. 11/018,448, filed Dec. 20, 2004, to Linden Cornett et al.
Microsoft Corporation,"Scalable Networking With RSS", WinHEC 2005 Update, Apr. 19, 2005, 16 pages.

* cited by examiner

Primary Examiner—Chirag G. Shah
Assistant Examiner—Minh-Trang Nguyen
(74) Attorney, Agent, or Firm—Grossman, Tucker, Perreault & Pfleger, PLLC

(57) ABSTRACT

In an embodiment, a method is provided. The method of this embodiment provides generating one or more packets of data, the one or more packets of data being associated with a connection; and associating the one or more packets with one of a plurality of transmit queues based, at least in part, on the connection associated with the one or more packets.

12 Claims, 5 Drawing Sheets

SCALING EGRESS NETWORK TRAFFIC

FIELD

Embodiments of this invention relate to scaling egress network traffic.

BACKGROUND

As network speeds increase, it becomes necessary to scale packet processing across multiple processors in a system. For receive processing, a feature called RSS (Receive Side Scaling) can distribute incoming packets across multiple processors in a system. RSS is a Microsoft® Windows® operating system technology that enables receive-processing to scale with the number of available computer processors by allowing the network load from a network controller to be balanced across multiple processors. RSS is described in "Scalable Networking: Eliminating the Receive Processing Bottleneck—Introducing RSS", WinHEC (Windows Hardware Engineering Conference) 2004, Apr. 14, 2004 (hereinafter "the WinHEC Apr. 14, 2004 white paper"). It is also scheduled to be part of the yet-to-be-released future version of the Network Driver Interface Specification (NDIS). NDIS describes a Microsoft® Windows® device driver that enables a single network controller, such as a NIC (network interface card), to support multiple network protocols, or that enables multiple network controllers to support multiple network protocols. The current version of NDIS is NDIS 5.1, and is available from Microsoft® Corporation of Redmond, Wash. The subsequent version of NDIS, known as NDIS 5.2, available from Microsoft® Corporation, is currently known as the "Scalable Networking Pack" for Windows Server 2003.

While there are defined mechanisms that enable receive processing to scale with increasing network speeds, there currently are no such known mechanisms defined for transmit processing. For example, when an application executes simultaneously on different processors, a transmit request (having one or more packets) that originates with an application may typically be propagated through the protocol stack, and call into a network device driver on the same processor (assuming a multithreaded network device driver). If the network device driver only supports one transmit queue, the network device driver may have to acquire a spin lock on the single transmit queue and wait until other processors have released their locks on the transmit queue. The spin lock may result in lock contention which may degrade performance by requiring threads on one processor to "busy wait", and unnecessarily increasing processor utilization, for example.

One possibility would be to have multiple transmit queues, and to associate each transmit queue with one or more processors. This would require that packets be posted to one of the transmit queues based on which processor generated the packets. However, since applications are not guaranteed to always transmit from the same processor for a given connection, it is possible that earlier packets on a highly-loaded processor may be transmitted after later packets on a lightly-loaded processor resulting in out-of-order transmits.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated.

Figure 1:
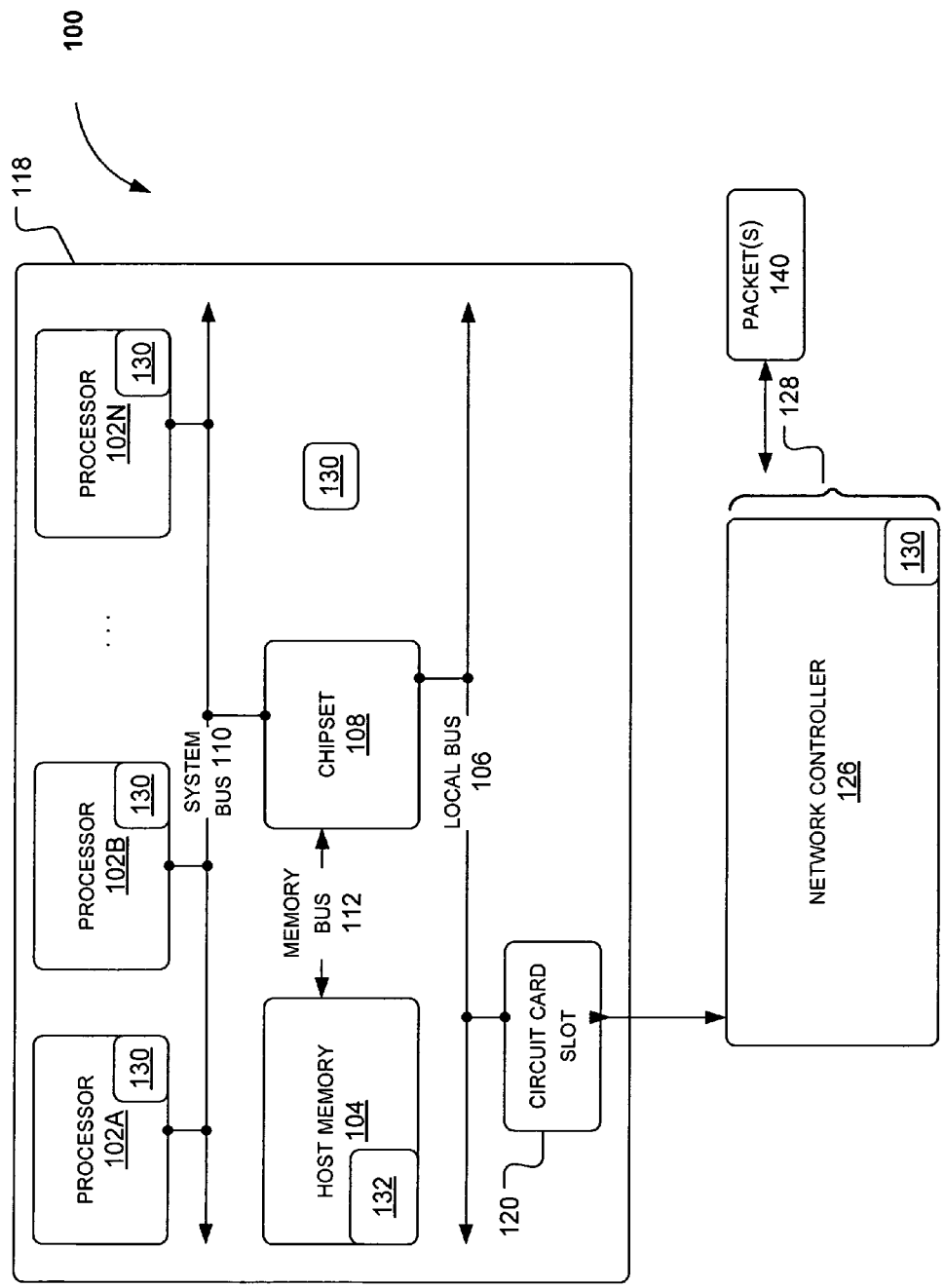
FIG. 1 illustrates a system according to an embodiment.

Methods described herein may be implemented in a system, such as system 100 illustrated in FIG. 1. System 100 may comprise one or more processors 102A, 102B, . . . , 102N. A "processor" as discussed herein relates to a combination of hardware and software resources for accomplishing computational tasks. For example, a processor may comprise a system memory and processing circuitry (e.g., a central processing unit (CPU) or microcontroller) to execute machine-readable instructions for processing data according to a predefined-instruction set. Alternatively, a processor may comprise just the processing circuitry (e.g., CPU). Another example of a processor is a computational engine that may be comprised in a multi-core processor, for example, where the operating system may perceive the computational engine as a discrete processor with a full set of execution resources. However, these are merely examples of processor and embodiments of the present invention are not limited in this respect.

Each processor 102A, 102B, . . . , 102N may be a coprocessor. In an embodiment, one or more processors 102A, 102B, . . . , 102N may perform substantially the same functions. Any one or more processors 102A, 102B, . . . , 102N may comprise, for example, an Intel® Pentium® microprocessor that is commercially available from the Assignee of the subject application. Of course, alternatively, any of processors 102A, 102B, . . . , 102N may comprise another type of processor, such as, for example, a microprocessor that is manufactured and/or commercially available from Assignee, or a source other than the Assignee of the subject application, without departing from embodiments of the invention.

System 100 may additionally comprise memory 104. Memory 104 may store machine-executable instructions 132 that are capable of being executed, and/or data capable of being accessed, operated upon, and/or manipulated. "Machine-executable" instructions as referred to herein relate to expressions which may be understood by one or more machines for performing one or more logical operations. For example, machine-executable instructions may comprise instructions which are interpretable by a processor compiler for executing one or more operations on one or more data objects. However, this is merely an example of machine-executable instructions and embodiments of the present invention are not limited in this respect. Memory 104 may, for example, comprise read only, mass storage, random access computer-accessible memory, and/or one or more other types of machine-accessible memories.

Chipset 108 may comprise one or more integrated circuit chips, such as those selected from integrated circuit chipsets commercially available from Intel® Corporation (e.g., graphics, memory, and I/O controller hub chipsets), although other one or more integrated circuit chips may also, or alternatively, be used. According to an embodiment, chipset 108 may comprise an input/output control hub (ICH), and a memory control hub (MCH), although embodiments of the invention are not limited by this. Chipset 108 may comprise a host bridge/hub system that may couple processor 102A, 102B, . . . , 102N, and host memory 104 to each other and to local bus 106. Chipset 108 may communicate with memory 104 via memory bus 112 and with host processor 102 via system bus 110. In alternative embodiments, host processor 102 and host memory 104 may be coupled directly to bus 106, rather than via chipset 108.

Local bus 106 may be coupled to a circuit card slot 120 having a bus connector (not shown). Local bus 106 may comprise a bus that complies with the Peripheral Component Interconnect (PCI) Local Bus Specification, Revision 3.0, Feb. 3, 2004 available from the PCI Special Interest Group, Portland, Oreg., U.S.A. (hereinafter referred to as a "PCI bus"). Alternatively, for example, bus 106 may comprise a bus that complies with the PCI Express™ Base Specification, Revision 1.1, Mar. 28, 2005 also available from the PCI Special Interest Group (hereinafter referred to as a "PCI Express bus"). Bus 106 may comprise other types and configurations of bus systems.

System 100 may additionally comprise one or more network controllers 126 (only one shown). A "network controller" as referred to herein relates to a device which may be coupled to a communication medium to transmit data to and/or receive data from other devices coupled to the communication medium, i.e., to send and receive network traffic. For example, a network controller may transmit packets 140 to and/or receive packets 140 from devices coupled to a network such as a local area network. As used herein, a "packet" means a sequence of one or more symbols and/or values that may be encoded by one or more signals transmitted from at least one sender to at least one receiver. Such a network controller 126 may communicate with other devices according to any one of several data communication formats such as, for example, communication formats according to versions of IEEE (Institute of Electrical and Electronics Engineers) Std. 802.3 (CSMA/CD Access Method, 2002 Edition); IEEE Std. 802.11 (LAN/MAN Wireless LANS, 1999 Edition), IEEE Std. 802.16 (2003 and 2004 Editions, LAN/MAN Broadband Wireless LANS), Universal Serial Bus, Firewire, asynchronous transfer mode (ATM), synchronous optical network (SONET) or synchronous digital hierarchy (SDH) standards.

In an embodiment, network controller 126 may be comprised on system motherboard 118. Rather than reside on motherboard 118, network controller 126 may be integrated onto chipset 108. Network controller 126 may instead be comprised in a circuit card 128 (e.g., NIC or network interface card) that may be inserted into circuit card slot 120. Circuit card slot 120 may comprise, for example, a PCI expansion slot that comprises a PCI bus connector (not shown). PCI bus connector (not shown) may be electrically and mechanically mated with a PCI bus connector (not shown) that is comprised in circuit card 128. Circuit card slot 120 and circuit card 128 may be constructed to permit circuit card 128 to be inserted into circuit card slot 120. When circuit card 128 is inserted into circuit card slot 120, PCI bus connectors (not shown) may become electrically and mechanically coupled to each other. When PCI bus connectors (not shown) are so coupled to each other, logic 130 in circuit card 128 may become electrically coupled to system bus 110.

System may comprise logic 130. Logic 130 may comprise hardware, software, or a combination of hardware and software (e.g., firmware). For example, logic 130 may comprise circuitry (i.e., one or more circuits), to perform operations described herein. For example, logic 130 may comprise one or more digital circuits, one or more analog circuits, one or more state machines, programmable logic, and/or one or more ASIC's (Application-Specific Integrated Circuits). Logic 130 may be hardwired to perform the one or more operations. Alternatively or additionally, logic 130 may be embodied in machine-executable instructions 132 stored in a memory, such as memory 104, to perform these operations. Alternatively or additionally, logic 130 may be embodied in firmware. Logic may be comprised in various components of system 100, including network controller 126, chipset 108, one or more processors 102A, 102B, . . . , 102N, and/or on motherboard 118. Logic 130 may be used to perform various functions by various components as described herein.

System 100 may comprise more than one, and other types of memories, buses, processors, and network controllers. For example, system 100 may comprise a server having multiple processors 102A, 102B, . . . , 102N and multiple network controllers 126. Processors 102A, 102B, . . . , 102N, memory 104, and busses 106, 110, 112 may be comprised in a single circuit board, such as, for example, a system motherboard 118, but embodiments of the invention are not limited in this respect.

Figure 2:
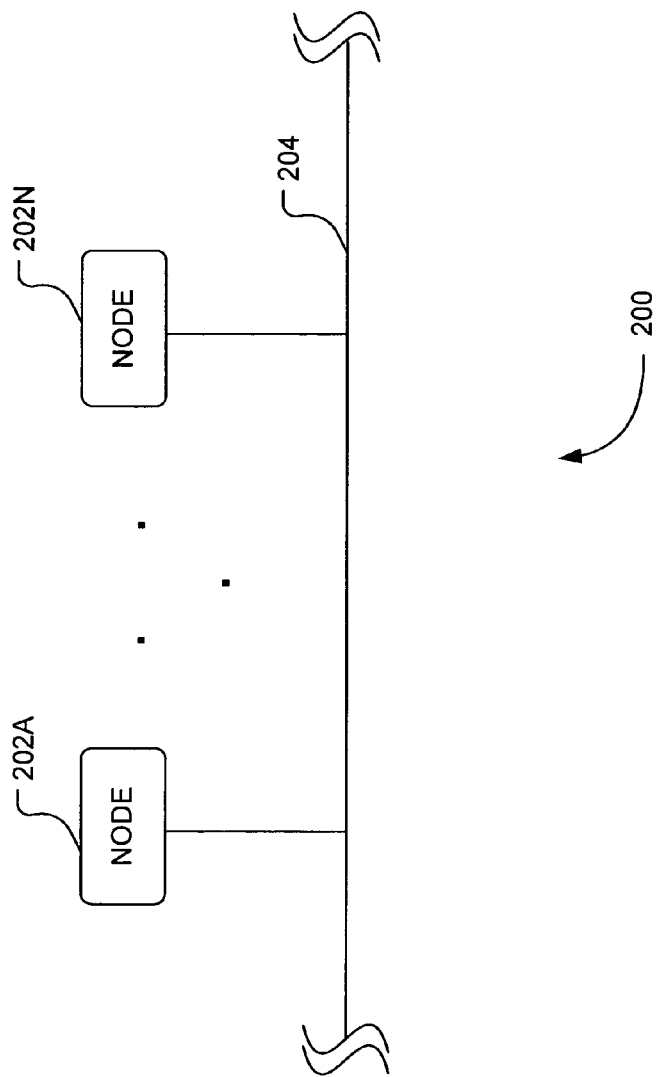
FIG. 2 illustrates a network according to an embodiment.

FIG. 2 illustrates a network 200 in which embodiments of the invention may operate. Network 200 may comprise a plurality of nodes 202A, . . . 202N, where each of nodes 202A, . . . , 202N may be communicatively coupled together via a communication medium 204. Nodes 202A . . . 202N may transmit and receive sets of one or more signals via medium 204 that may encode one or more packets. Communication medium 104 may comprise, for example, one or more optical and/or electrical cables, although many alternatives are possible. For example, communication medium 104 may comprise air and/or vacuum, through which nodes 202A . . . 202N may wirelessly transmit and/or receive sets of one or more signals.

In network 200, one or more of the nodes 202A . . . 202N may comprise one or more intermediate stations, such as, for example, one or more hubs, switches, and/or routers; additionally or alternatively, one or more of the nodes 202A . . . 202N may comprise one or more end stations. Also additionally or alternatively, network 200 may comprise one or more not shown intermediate stations, and medium 204 may communicatively couple together at least some of the nodes 202A . . . 202N and one or more of these intermediate stations. Of course, many alternatives are possible.

Figure 3:
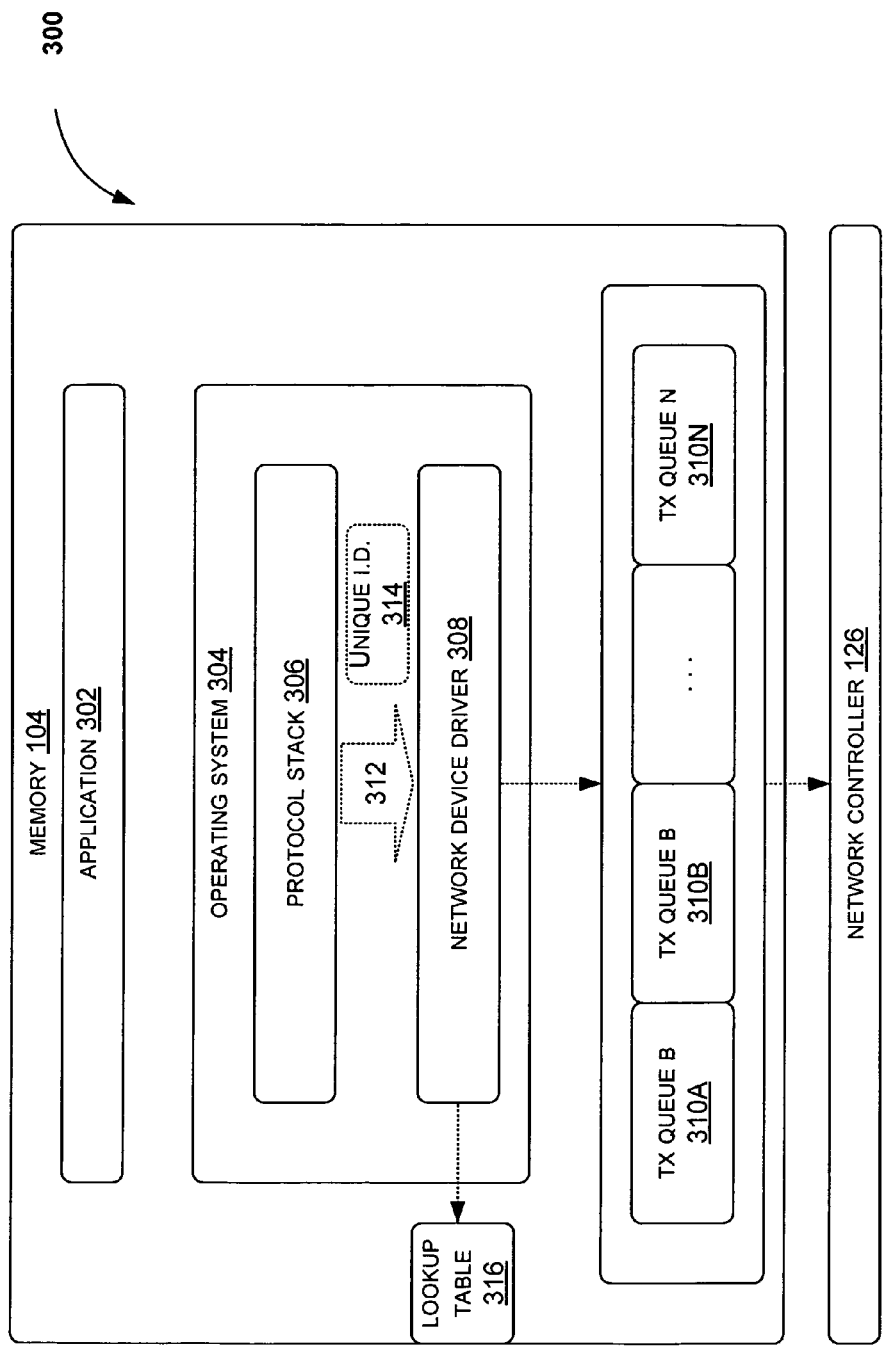
FIG. 3 illustrates a detailed system according to an embodiment.

FIG. 3 illustrates a system 300 according to at least one embodiment of the invention. As illustrated in FIG. 3, memory 104 may host an operating system 304. Operating system 304 may manage system resources and control tasks that are run on system 100. Operating system 304 may comprise one or more protocol stacks 306 (only one shown). Protocol stack 306 may execute one or more programs to process packets 140. An example of a protocol stack is a TCP/IP (Transport Control Protocol/Internet Protocol) protocol stack comprising one or more programs for handling (e.g., processing or generating) packets 140 to transmit and/or receive over a network. Protocol stack 306 may alternatively be comprised on a dedicated sub-system such as, for example, a TCP offload engine. Operating system 304 may additionally comprise one or more drivers 308 (only one shown). For example, driver 308 may comprise a network device driver 308. Network device driver 308 may provide the interface between a network controller, such as network controller 126, and operating system 304. Memory 104 may additionally comprise one or more applications 302 (only one shown).

Application 302 may run programs at a end user-level, including but not limited to, for example, word processors and spreadsheets.

Figure 4:
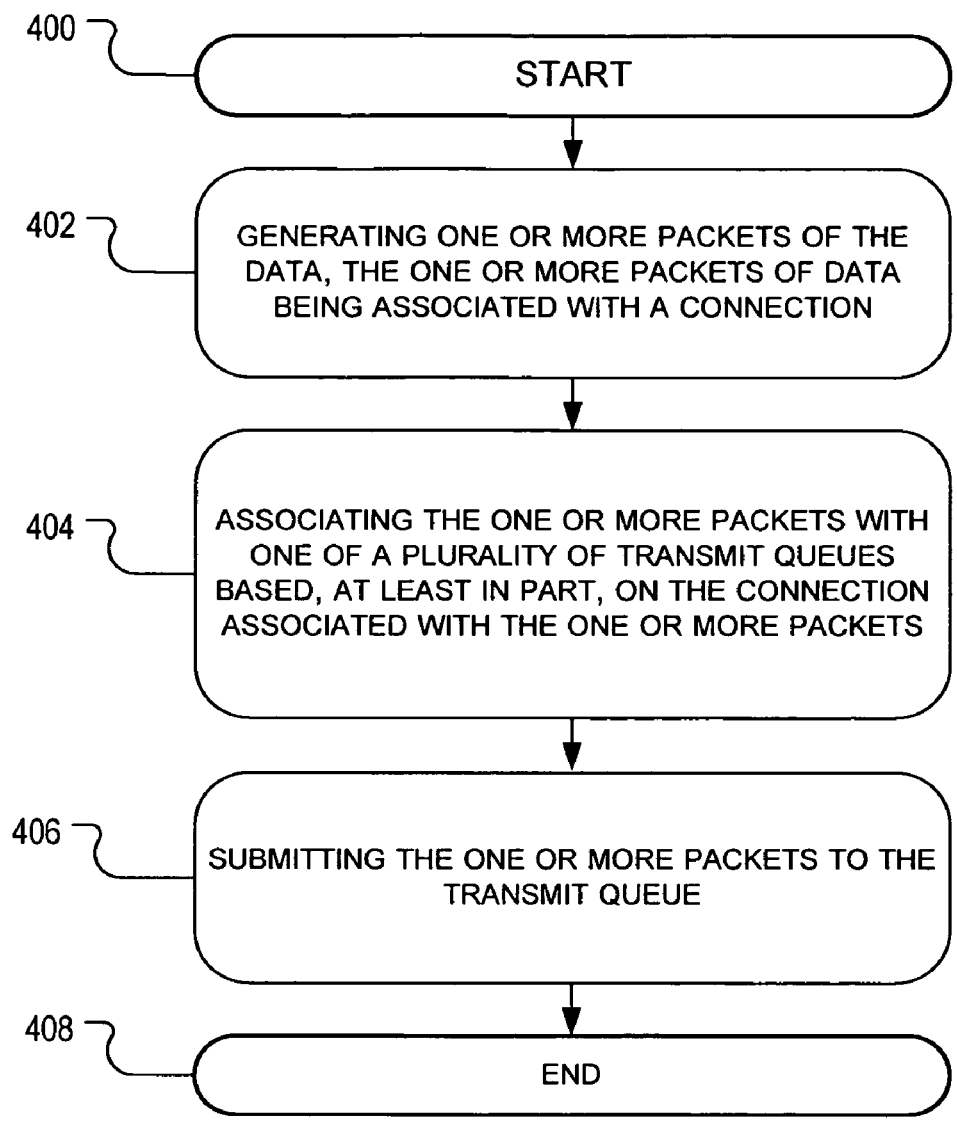
FIG. 4 is a flowchart illustrating a method according to an embodiment.

FIG. 4 illustrates a method according to one embodiment of the invention. The method of FIG. 4 begins at block 400 and continues to block 402 where the method may comprise generating one or more packets of data, the one or more packets of data being associated with a connection.

In an embodiment, for example, application 302 may create a socket API (application programming interface) to request a connection 312 that enables application 302 to communicate with another application over a network. Protocol stack 306 may establish the connection 312. Application 302 may generate data and call into protocol stack 306 of operating system 304 to create one or more packets 140 that include the data to be sent to the other application. Each packet 140 may include a header and payload. The header may include information about the connection 312, for example, a source port and destination port. The payload may include at least a portion of the data to be sent to the other application. In an embodiment, protocol stack 306 may call into network device driver 308 to create a transmit request that includes the one or more packets of data 140.

At block 404, the method may comprise associating the one or more packets with one of a plurality of transmit queues based, at least in part, on the connection associated with the one or more packets.

In an embodiment, associating the one or more packets 140 with one of a plurality of transmit queues 310A, 310B, ..., 310N based, at least in part, on the connection 312 associated with the one or more packets 140 may comprise directing the one or more packets 140 based, at least in part, on a known number of transmit queues 310A, 310B, ..., 310N provided by a particular network interface. In this embodiment, for example, protocol stack 306 may be aware of the number of transmit queues 310A, 310B, ..., 310N provided by a particular network interface, and the specific characteristics of the network interface. For example, "network interface" may refer to the network device driver 308 that is exposed to system 100, where the network device driver 308 may indicate whether transmit scaling is supported. If it is, protocol stack 306 may direct network device driver 308 to post packets associated with a given TCP connection to the same transmit queue.

In another embodiment, associating the one or more packets 140 with one of a plurality of transmit queues 310A, 310B, ..., 310N based, at least in part, on the connection 312 associated with the one or more packets 140 may comprise generating a unique identifier 314 to associate with the connection, and associating the unique identifier 314 (used to identify a given connection) with one of the transmit queues 310A, 310B, ..., 310N. For example, protocol stack 306 may generate the unique identifier. The unique identifier may comprise a four-tuple comprising the local and remote IP addresses and local and remote TCP ports that identify the connection. Protocol stack 306 may propagate the unique identifier 314 to network device driver 308, and network device driver 308 may use this to associate the one or more packets 140 with one of the plurality of transmit queues 310A, 310B, ..., 310N.

The unique identifier 314 may be associated with one of the transmit queues 310A, 310B, ..., 310N by, for example, using an algorithm to map the unique identifier 314 to a given transmit queue 310A, 310B, ..., 310N. Alternatively, the unique identifier 314 may be indexed into a lookup table 316 having entries of unique identifiers 314 and corresponding transmit queues 310A, 310B, ..., 310N, where a corresponding one of the plurality of transmit queues 310A, 310B, ..., 310N may be selected. If the unique identifier 314 is not found in the lookup table 316, then an entry may be added to the lookup table 316. There are a number of ways in which the transmit queue 310A, 310B, ..., 310N corresponding to a given unique identifier 314 may be selected for new entries. For example, round robin selection, or using low bits from the unique identifier 314 to map to a transmit queue 310A, 310B, ..., 310N.

In an embodiment, for example, unique identifier 314 may comprise an RSS hash value. An RSS hash value may be calculated by performing a hash function over one or more header fields in a header of a packet to be transmitted. In an embodiment, the selected header fields in a header over which a hash function is performed would ensure that all packets going out on the same connection will be associated with the same hash value. Furthermore in this embodiment, lookup table 316 may comprise an indirection table as described in the NDIS specification.

At block 406, the method may comprise submitting the one or more packets to the transmit queue. In an embodiment, network device driver 126 may post the one or more packets 140 to the transmit queue 310A, 310B ..., 310N. The one or more packets 140 on the transmit queue 310A, 310B, ..., 310N may subsequently be consumed by network controller 126 for transmission over network to the other system.

In an embodiment, prior to said submitting the one or more packets 140 to the transmit queue 310A, 310B, ..., 310N, protocol stack 306 may determine if the lookup table 316 has changed, and if the lookup table 316 has changed, the protocol stack 306 may wait for one or more previously submitted packets 140 to complete transmission over the wire before submitting new packets 140 to network device driver 208. For example, protocol stack 306 may change the lookup table 316 periodically to balance the load across the processors 102A, 102B, ..., 102N in the system.

The method may end at block 408.

Figure 5:
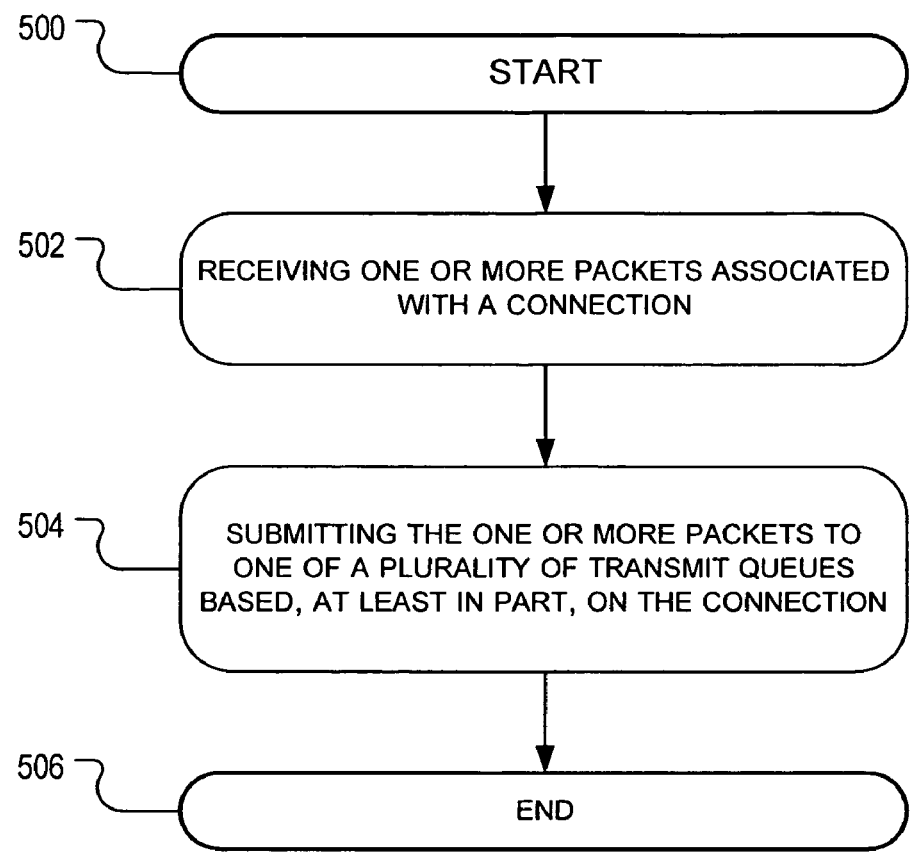
FIG. 5 is a flowchart illustrating another method according to an embodiment.

FIG. 5 illustrates a flowchart in accordance with another embodiment of the invention. The method of FIG. 5 begins at block 500 and continues to block 502 where the method may comprise receiving one or more packets associated with a connection. In an embodiment, network device driver 308 may receive one or more packets 140 associated with a connection. For example, after protocol stack 306 generates one or more packets 140, protocol stack 306 may propagate the one or more packets 140 to network device driver 308, for example, encapsulated in a transmit request.

At block 504, the method may comprise submitting the one or more packets to one of a plurality of transmit queues based, at least in part, on the connection. In an embodiment, submitting the one or more packets 140 to one of a plurality of transmit queues 310A, 310B, ..., 310N based, at least in part, on the connection 312, may comprise directing the one or more packets 140 based, at least in part, on a known number of transmit queues 310A, 310B, ..., 310N provided by a network interface.

In another embodiment, submitting the one or more packets 140 to one of a plurality of transmit queues 310A, 310B, ..., 310N based, at least in part, on the connection 312, may comprise submitting the one or more packets 140 to a transmit queue 310A, 310b, ..., 310N with which a unique identifier 314 is associated. For example, this may be done by submitting the one or more packets 140 based, at least in part, on an algorithm used to map the unique identifier 314 to a transmit queue 310A, 310B, ..., 310N. Alternatively, this may comprise submitting the one or more packets 140 to a transmit queue based, at least in part, on using the unique identifier 314 to index into a lookup table 316, and selecting a corresponding one of the plurality of transmit queues 310A, 310B, ..., 310N from the lookup table 316. For example, in addition to generating one or more packets 140, protocol stack 306 may additionally generate a unique identifier 314 and propagate this to network device driver 308. Network device driver 308 may use the unique identifier 314 to associate with one of the plurality of transmit queues 310A, 310B, ..., 310N.

In an embodiment, prior to submitting the one or more packets 140 to one of a plurality of transmit queues 310A, 310B, ..., 310N, protocol stack 306 may determine if the lookup table 316 has changed, and if the lookup table 316 has changed, the protocol stack 306 may wait for one or more previously submitted packets to complete transmission.

The method may end at block 506.

CONCLUSION

Therefore, in an embodiment, a method may comprise generating one or more packets of data, the one or more packets of data being associated with a connection; and associating the one or more packets with one of a plurality of transmit queues based, at least in part, on the connection associated with the one or more packets.

Embodiments of the invention may enable transmit packet processing to scale with network speeds increase. By posting packets to transmit queues based on the connection with which the packets are associated, the problem of scaling transmit processing with increased network speeds is addressed, and traffic may be scaled efficiently across multiple transmit queues.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. A method for distributing traffic across a plurality of transmitting queues, said method executed on a transmit side of a network connection, said method comprising:
   establishing, using a protocol stack, said network connection in response to a request from a first application, wherein said connection is configured for communication between said first application and a second application over a network;
   generating, by said protocol stack, an identifier associated with said connection;
   preparing, using said protocol stack, a transmit request to send to a network device driver in response to said request from said first application, wherein said transmit request includes said identifier;
   sending said transmit request to said network device driver;
   selecting, based on said identifier, a transmit queue from a plurality of transmit queues using said network device driver, wherein said selecting comprises using said identifier as an index in a lookup table, each entry in said lookup table corresponding to one of said plurality of transmit queues;
   determining whether said lookup table has changed using said protocol stack; and
   ensuring previously submitted transmit requests have completed prior to sending a new transmit request to said network device driver if said lookup table has changed.

2. The method of claim 1 wherein said protocol stack is a Transport Control Protocol/Internet Protocol (TCP/IP) stack.

3. The method of claim 1 wherein said identifier is a hash value determined by performing a hash function over one or more header fields in a header of a packet to be transmitted.

4. An apparatus for distributing traffic across a plurality of transmitting queues, said apparatus being on a transmit side of a network connection, said apparatus comprising:
   logic comprising at least one of hardware, circuitry, hardwired, machine-executable instructions stored in memory or firmware, said logic configured to:
      establish, using a protocol stack, said network connection in response to a request from a first application, wherein said connection is configured for communication between said first application and a second application over a network;
      generate, by said protocol stack, an identifier associated with said connection;
      prepare, using said protocol stack, a transmit request to send to a network device driver in response to said request from said first application, wherein said transmit request includes said identifier;
      send said transmit request to said network device driver;
      select, based on said identifier, a transmit queue from a plurality of transmit queues using said network device driver wherein said network device driver is configured to select said transmit queue using said identifier as an index in a lookup table, each entry in said lookup table corresponding to one of said plurality of transmit queues;
      determine whether said lookup table has changed using said protocol stack; and
      ensure previously submitted transmit requests have completed prior to sending a new transmit request to said network device driver if said lookup table has changed.

5. The apparatus of claim 4 wherein said protocol stack is a Transport Control Protocol/Internet Protocol (TCP/IP) stack.

6. The apparatus of claim 4 wherein said identifier is a hash value determined by performing a hash function over one or more header fields in a header of a packet to be transmitted.

7. A host computer system for distributing traffic across a plurality of transmitting queues, said system being on a transmit side of a network connection, said system comprising:
   at least one processor;
   a host memory coupled to said at least one processor, said host memory configured to store at least one application, an operating system comprising a protocol stack and a network device driver, and said memory comprising a plurality of transmit queues configured to store packets to be transmitted,
      wherein said protocol stack is configured to establish said network connection in response to a request from a first application, wherein said connection is configured for communication between said first application and a second application over a network, said protocol stack is further configured to generate an identifier associated with said connection, prepare a transmit request to send to said network device driver in response to said request from said first application, wherein said transmit request includes said identifier, and send said transmit request to said network device driver, and said protocol stack is further configured to determine whether said lookup table has changed, and
      ensure previously submitted transmit requests have completed prior to sending a new transmit request to said network device driver if said lookup table has changed, and wherein said network device driver is configured to select a transmit queue from said plurality of transmit queues using said identifier as an index in a lookup table, each entry in said lookup table corresponding to one of said plurality of transmit queues; and a network controller coupled to said host memory wherein said network controller is configured to transmit a packet over said network to said second application.

8. The system of claim 7 wherein said protocol stack is a Transport Control Protocol/Internet Protocol (TCP/IP) stack.

9. The system of claim 7 wherein said identifier is a hash value determined by performing a hash function over one or more header fields in a header of a packet to be transmitted.

10. An article for distributing traffic across a plurality of transmitting queues, said article comprising memory, said memory having instructions stored thereon that when executed by a machine on a transmit side of a network connection result in the following:

establishing, using a protocol stack, said network connection in response to a request from a first application, wherein said connection is configured for communication between said first application and a second application over a network;

generating, by said protocol stack, an identifier associated with said connection;

preparing, using said protocol stack, a transmit request to send to a network device driver in response to said request from said first application, wherein said transmit request includes said identifier;

sending said transmit request to said network device driver;

selecting, based on said identifier, a transmit queue from a plurality of transmit queues using said network device driver, wherein said selecting comprises using said identifier as an index in a lookup table, each entry in said lookup table corresponding to one of said plurality of transmit queues;

determining whether said lookup table has changed using said protocol stack; and ensuring previously submitted transmit requests have completed prior to sending a new transmit request to said network device driver if said lookup table has changed.

11. The article of claim 10 wherein said protocol stack is a Transport Control Protocol/Internet Protocol (TCP/IP) stack.

12. The article of claim 10 wherein said identifier is a hash value determined by performing a hash function over one or more header fields in a header of a packet to be transmitted.

* * * * *